H. F. WAITE.
X-RAY TUBE CURRENT MEASURING SYSTEM.
APPLICATION FILED JULY 11, 1916.
1,307,645.
Patented June 24, 1919.
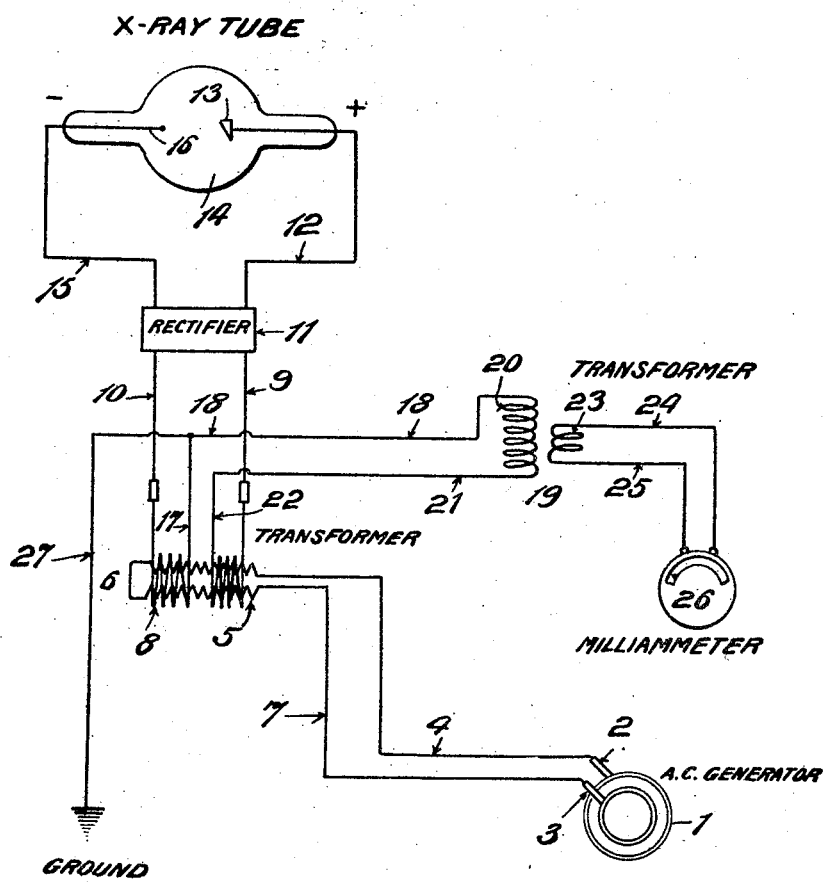

UNITED STATES PATENT OFFICE.

HARRY F. WAITE, OF WHITESTONE LANDING, NEW YORK.

X-RAY-TUBE CURRENT-MEASURING SYSTEM.

1,307,645. Specification of Letters Patent. Patented June 24, 1919.

Application filed July 11, 1916. Serial No. 108,602.

*To all whom it may concern:*

Be it known that I, HARRY F. WAITE, a citizen of the United States, and a resident of Whitestone Landing, county of Queens, city and State of New York, have invented a new and useful Improvement in X-Ray-Tube Current-Measuring Systems, of which the following is a specification.

The object of my invention is to provide a simple, reliable and efficient apparatus by which tube current may always be accurately measured without danger to the operator and at a place most convenient to him. Heretofore such a current has been measured by an instrument placed in the path of the current that flows through the tube, that is the path of the rectified current as it has not been possible to obtain any measuring instrument which will accurately measure the minute alternating current which issues from the secondary of the transformer. By my invention, as hereinafter disclosed, it is possible to measure tube current in any desired place and time without any risk to the operator. This, and other objects are accomplished by my invention, one embodiment of which is hereinafter more particularly set forth.

For a more particular description, reference is to be had to the accompanying drawings in which the figure is a diagram of my improved system.

For clearness and conciseness of description, my invention is herein shown as applied to an alternating current system, it being understood that it may with equal facility be applied to a direct current system, that is a system in which the primary current is derived from a direct current source instead of an alternating current source as herein disclosed.

The alternating current generator 1 has two brushes 2 and 3 respectively. The brush 2 runs to a wire 4 which is connected to the primary 5 of a step-up transformer 6, in the conventional manner, and this transformer is also connected by a wire 7 to the brush 3. For convenience, all regulating instruments, pole changers, etc., are left out of the description and drawing, it being understood that they are employed in the conventional manner, wherever desired.

The secondary 8 of the transformer 6 has two leads 9 and 10 respectively, which run to the rectifier 11, which may be a rotary rectifier or any other kind, as desired, and from this rectifier 11 one wire 12 runs to the anode 13 of the tube 14, and the other wire 15 is connected to the cathode 16 of the tube 14.

The center winding of the secondary winding of the step-up transformer 6 is interrupted and a lead 17 runs therefrom to a wire 18 which is connected to a small step-down transformer 19 with its high tension coil 20 running to a second wire 21 which runs back to a lead 22 from the center coil of the secondary 8 of the step-up transformer 6, so that the circuit of the secondary 8 is always complete through the high tension coil 20 of the transformer 19. The low tension coil 23 of the transformer 19 is connected by two wires 24 and 25 respectively to the milliammeter. This milliammeter 26 is calibrated so as to correspond with what would be shown if a milliammeter were placed in the circuit of the tube, say in the wire 12, and the needle reads directly on the scale which is calibrated as just above indicated.

To prevent all static charges the wire 18 is grounded by a suitable wire 27, as indicated. The wire may be connected to the wire 7, if desired.

In view of the foregoing, the operation of my improved system will be readily understood. Assuming that the apparatus is in use in a normal manner, there will be a slight, but not a great current in the coil 20 of the small transformer 19, because the current in the secondary of the transformer 6, that is the coil 8 is small. The minute current in the coil 20 generates a much stronger current of a lower voltage in the coil 23, and this current is sufficient to actuate the milliammeter 26 so that this ammeter will read according to the volume of the current passing through the X-ray tube. As the tension in the wires 24 and 25 is always low it is possible to place this instrument 26 where most convenient to the operator, and it is impossible for him to get a severe shock from it. This is not the case where such an instrument is interposed in circuit with the wire 12 or with the wire 15, in the conventional manner.

While I have shown and described one embodiment of my invention, it is obvious that it is not restricted thereto, but is broad enough to cover all structures that come within the scope of the annexed claim.

Having thus described my invention, what I claim is,

In a system of the class described, a step-up transformer and means for energizing the same, a secondary in said transformer connected to an X-ray tube, a step-down transformer with one coil connected to leads taken from the center of the secondary of the said step-up transformer, a low tension current coil in said step-down transformer and a meter connected therewith so that the volume of the current passing through the X-ray tube may be read on said meter.

HARRY F. WAITE.